United States Patent

[11] 3,573,600

[72] Inventor Thomas E. Carlisle
         Addison, Ill.
[21] Appl. No. 848,458
[22] Filed Aug. 8, 1969
[45] Patented Apr. 6, 1971
[73] Assignee Vapor Corporation
         Chicago, Ill.

[54] COMBINATION THREE PHASE-ONE PHASE INVERTER
3 Claims, 5 Drawing Figs.
[52] U.S. Cl. .................................................. 321/7,
                                        321/54, 321/58
[51] Int. Cl. ........................................... H02m 5/14
[50] Field of Search ........................................ 321/5, 7,
                                        51, 54, 56, 58

[56] References Cited
UNITED STATES PATENTS

| | | | |
|---|---|---|---|
| 2,911,581 | 11/1959 | Rockafellow | 321/56X |
| 3,368,136 | 2/1968 | Krabbe | 321/7 |
| 3,374,414 | 3/1968 | Garnett | 321/5 |
| 3,381,137 | 4/1968 | Brown | 321/7X |
| 3,407,347 | 10/1968 | Kobayashi et al. | 321/7 |
| 3,448,366 | 6/1969 | Goff | 321/5 |

*Primary Examiner*—William M. Shoop, Jr.
*Attorney*—Norman Aon Witt

ABSTRACT: An inverter having drive change means for converting three phase operation to single phase operation where single phase power is supplied at the same rating as the rating for three phase power. A controlled drive means in a solid state static inverter for the power outputs supplies the outputs 120° out of phase for three phase operation or in phase for single phase operation.

Patented April 6, 1971 3,573,600

INVENTOR
THOMAS E. CARLISLE
BY

ATTORNEY

COMBINATION THREE PHASE-ONE PHASE INVERTER

This invention relates in general to solid state static inverters, and more particularly to a switching means for use with a three-phase static inverter to convert the outputs to single-phase of the same capability as the three phase output.

The phase relationship in a three-phase rotating machine is established mechanically by the relative positions of the conductors in the magnetic paths, while the phase relationship in a static inverter is established electrically by the relative switching times of the drive means. Connecting three-phase displaced outputs for single phase yields only two times the individual power of one phase due to the phase relationships. Therefore, in order to support 100 percent rating single-phase load in a rotating machine, the machine must have at least 150 percent rating in each of the three-phase windings, thereby necessitating 150 percent overdesign that greatly increases the weight and cost of the machine. Similarly, the same problem is encountered in heretofore known static inverters.

The present invention, while relating to solid state static inverters, overcomes the heretofore known difficulty by providing a static inverter with a controlled drive means for the power stages which can supply drive signals 120° out of phase for three-phase operation and also supply the drive signals in phase for single-phase operation of the same capability as the three-phase operation. A switching means converts the inverter from three phase output to single-phase output having the same rating as the three-phase without the added weight and cost penalty associated with the heretofore necessary 150 percent overdesign. Logic circuitry is provided which includes a single switch for converting three-phase operation to single-phase operation to where all three-phase outputs are connected in parallel, and wherein single-phase output is of the same rating as the three-phase output.

Accordingly, it is an object of the present invention to provide a controlled drive means for the power stages of a static inverter which can selectively supply the outputs 120° out of phase for three-phase operation or in phase for single phase operation.

Another object of the invention is in the provision of a switching means for a static converter having three-phase outputs for converting to single-phase output at the same rating as the three-phase output, without incurring the weight and size problems heretofore necessitated by 150 percent overdesign.

Other objects, features and advantages of the invention will be apparent from the following detailed disclosure, taken in conjunction with the accompanying sheets of drawings, wherein like reference numerals refer to like parts, in which.

The switching or control drive means of the invention handles three power stages and is capable of supplying the power stages 120° out of phase for three-phase operation, or supplying the power stages in phase for single-phase operation.

Figure 3:
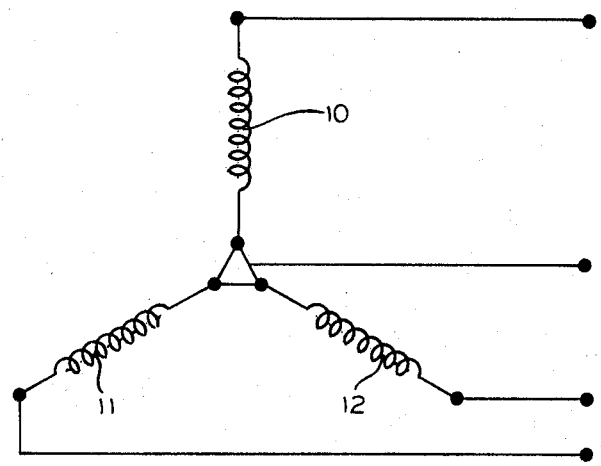
FIGS. 3, 4 and 5 are schematic diagrams illustrating the connection of phase outputs to obtain respectively three-phase operation, single-phase operation as heretofore known and single-phase operation according to the invention.
Figure 4:
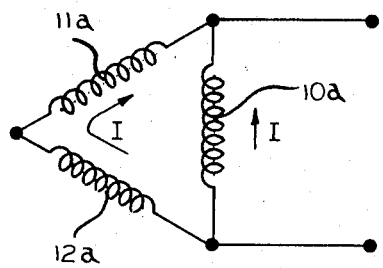

Three-phase operation of outputs from a rotating machine is illustrated in FIG. 3 wherein phase windings 10, 11 and 12 are "Wye" connected, 120° out of phase. Assuming that each winding produces 1 volt and one ampere, the power per winding would equal 1 watt, and the total power output of the three-phase operation would equal 3 watts. Connecting the same phase displaced outputs to establish single-phase operation, requires connection the windings as shown in FIG. 4, wherein the windings are represented as 10a, 11a and 12a. Because of the phase relationships, and the necessity to connect windings 10a, the power output would equal 2 watts. Therefore, in order to obtain the same power output capability, it would be necessary to design the machine so that in three phase operation each winding would yield a power of 1½ watts. This would necessitate 150 percent overdesign which would add considerable cost and weight. These problems have also been present in heretofore known static inverters.

Figure 5:
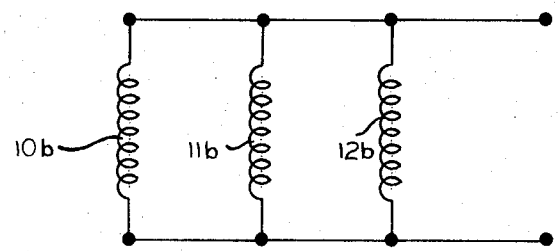

The present invention enables a solid state static inverter to have three-phase outputs operable 120° out of phase or in phase for respectively providing three phase or single-phase operation. FIG. 5 represents connection of the three-phase outputs in single-phase relation wherein the windings 10b, 11b and 12b are connected in parallel, thereby yielding 1 watt for each of the windings and a total of 3 watts which is the same capability as the "Wye" connected outputs of FIG. 3. While only "Wye"—0 configuration is illustrated it should be recognized that "Delta" configuration could be employed for three-phase operations.

Figure 1:
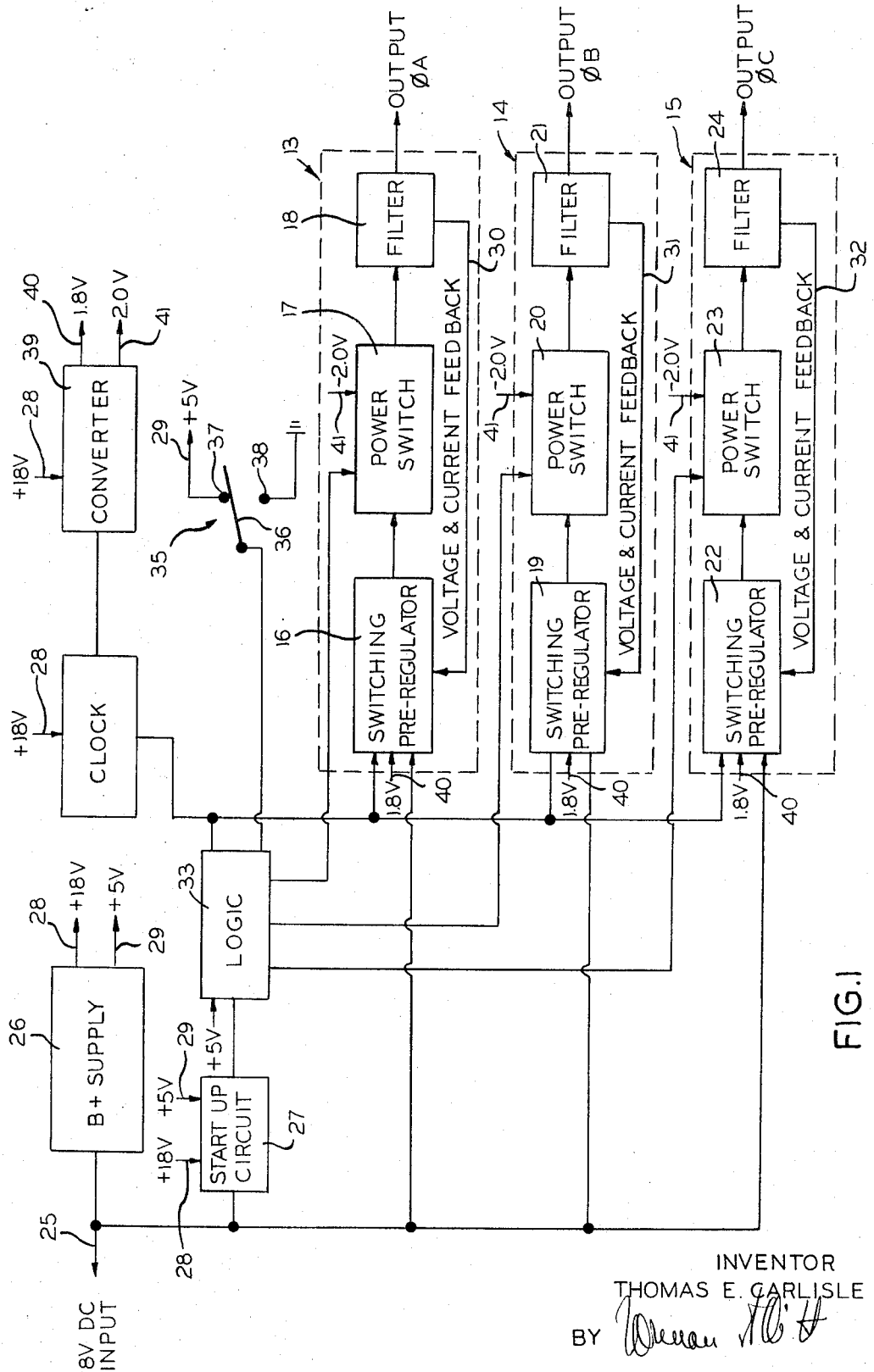
FIG. 1 is a block diagram of a static inverter employing the switching means according to the invention for converting three-phase operation.

A block diagram of a light weight inverter illustrating one form of the invention which is capable of producing the same power output when connected in either single-phase or three-phase configuration is illustrated in FIG. 1. The combination three-phase-single-phase inverter includes three identical single-phase channels 13, 14 and 15; each constituting an inverter by itself capable of producing a prescribed output. Channel 13 includes a switch preregulator 16, a power switch 17, and a filter 18. Channel 14 similarly includes a switch preregulator 19, a power switch 20 and a filter 21, while channel 15 includes a switch preregulator 22, a power switch 23 and a filter 24. A 28 VDC input 25 supplies power to the switch preregulators of each channel and to a B+ supply 26 and a startup circuit 27. The startup circuit 27 prevents damage to the power switches that might result from a load being applied at low input voltages. An 18-volt output 28 and a 5-volt output 29 are produced by the B+ supply 26 and delivered for operation of the desired circuits as indicated.

In each channel, the power switch converts the DC voltage at its input to a stepped waveform at its output to eliminate harmonics up to the 11th, thereby reducing the burden of the filter in each channel. The filter attenuates the 11th and higher order harmonics. The switching preregulator of each channel senses the output voltages and varies the DC voltage at the input to the power switch, thereby permitting each channel to be adjusted independently for the nominal output voltage. A voltage and current feedback circuit is provided in each channel, and respectively designated by the numerals 30, 31 and 32 to sense an overload condition in the channel and reduce the output of the switching preregulator, thereby limiting the output current even if the load is reduced to a short circuit.

A logic circuit 33 provides the drive signals for each of the power switches of the channels. A pulse train is produced by a clock 34 and fed into the logic circuit, as well as into the switch preregulators of each channel. The logic circuit serves to drive the channels in three-phase or single-phase operation, and it is controlled by a "mode" switch 35. The "mode" switch comprises a switch arm 36 connected to the logic circuit 33 and selectively movable between a three-phase contact 37 and a singel-phase contact 38. The decoding format of the logic circuit is therefore determined by the "mode" input signal as set by the "mode" switch 35. For single-phase operation, the signal is in 1 or high state, thereby locking the three output drive signals in phase. The "mode" signal is in the 0 or low state for three-phase operation.

The power switches of the channels require a voltage that is 1 to 2 volts negative with respect to ground, and this is provided by a converter 39 having output signals 40 and 41. Accordingly, the output 41 is utilized by the power switches, while a bias voltage output 40 is utilized by the switch preregulators.

It should be appreciated that any desired drive means may be employed to produce the output signals. The three-phase-single-phase switching arrangement of the invention is not dependent on any specific drive means.

Figure 2:
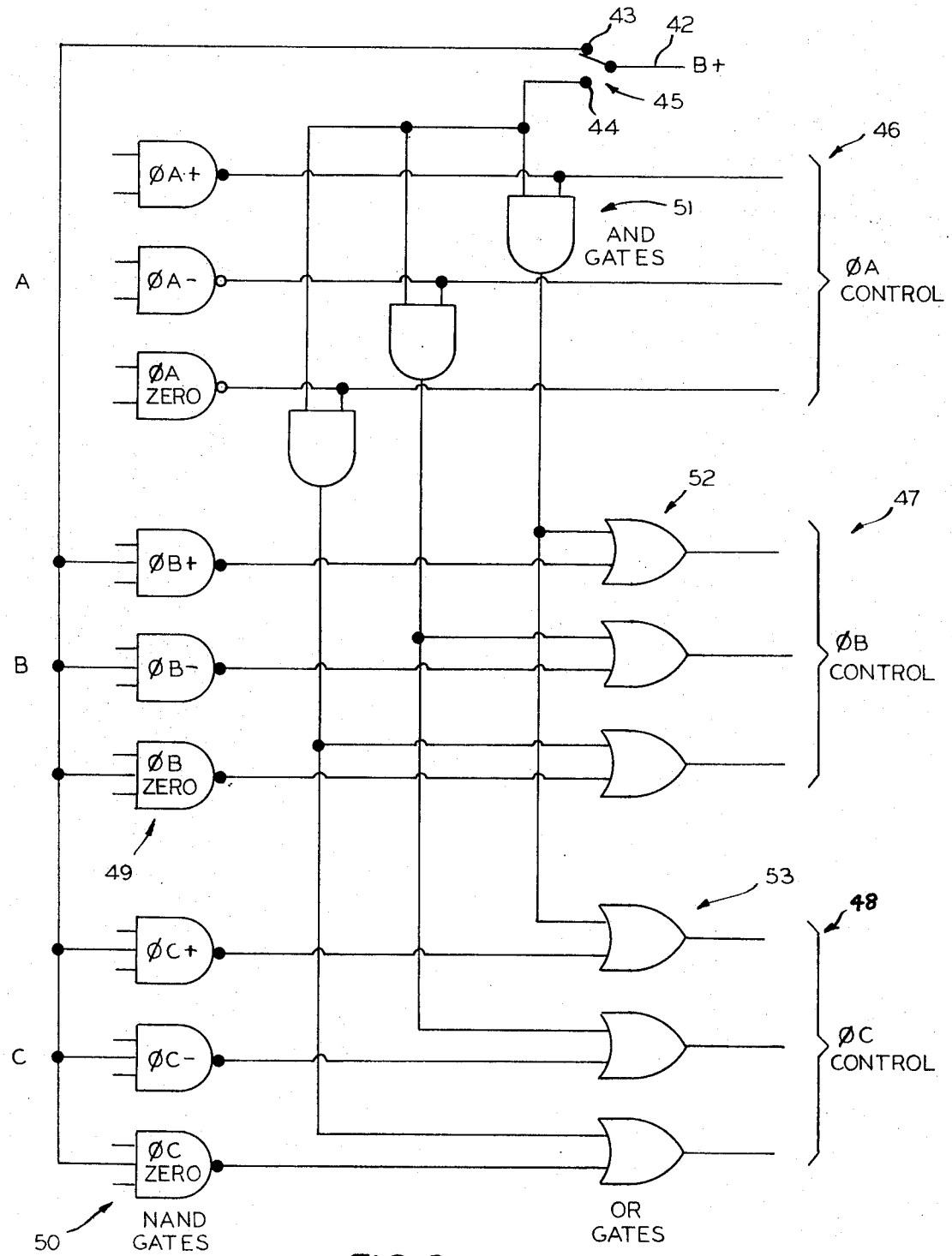
FIG. 2 is a logic circuit of the switching means.

The logic circuit is shown in FIG. 2 which permits instant revision of the three-phase output of the inverter to three single-phase outputs connected in parallel as represented in FIG.

5. A B+ voltage 42 is either applied to the three-phase tap 43 or the single-phase tap 44 of the "mode" switch 45. When the switch is in three-phase position, a 1 signal is applied to the NAND gates 49 and 50 of phases 47 and 48 to enable them for three-phase operation with phase 46 wherein each phase is 120° out of When the "mode" switch 45 is in single-phase position, the 1 is removed from the NAND gates 49 and 50, thereby disabling normal-phase outputs of phases 47 and 48. In this case the AND gates 51 of phase 46 are enabled so that the phase 46 output is now fed through the OR gates 52 and 53 to the phase 47 and the phase 48 controls. This in effect connects all phases in parallel and in phase with the phase 46 signal. Accordingly, the full power output of each phase is obtained in either three-phase or single-phase operation.

Hence, while preferred embodiments of the invention have been described and illustrated, it is to be understood that they are capable of variation and modification.

I claim:

1. In a static inverter having first, second and third outputs, a controlled drive means for selectively supplying the outputs 120° out of phase for three-phase operation or in phase for single-phase operation said controlled drive means including a logic circuit comprising, a two position "mode" switch connected to said circuit for selecting three-phase or single-phase operation, OR gates for said second and third outputs, an AND gate between said first output and said OR gates, means connecting said AND gate to said "mode" switch to be enabled upon selecting single-phase operation to effectively connect the outputs in parallel, NAND gates for said second and third outputs, and means connecting said NAND gates to said "mode" switch to be enabled upon selecting three-phase operation to permit said outputs to operate 120° out of phase.

2. In a static inverter convertible between three-phase and single-phase operation with the same power output capability and including first, second and third single-phase channels logic circuitry for causing said channels to operate 120° out of phase in three-phase configuration or to operate in phase and parallel connection in single-phase configuration, said logic circuitry comprising a "mode" switch having three-phase and single-phase positions, NAND gate means for said second and third channels connected to said three-phase position and enabled thereby to cause the channels to operate 120° out of phase, OR gate means for said second and third channels connected to said first channel through AND gate means, and means connecting the single-phase position of said "mode" switch to said AND gate means and enabled thereby to cause the channels to be connected in parallel single-phase configuration.

3. The combination of claim 2 wherein said "mode" switch in three-phase position connects said channels to be connected in "Wye" configuration.